Figure 1:
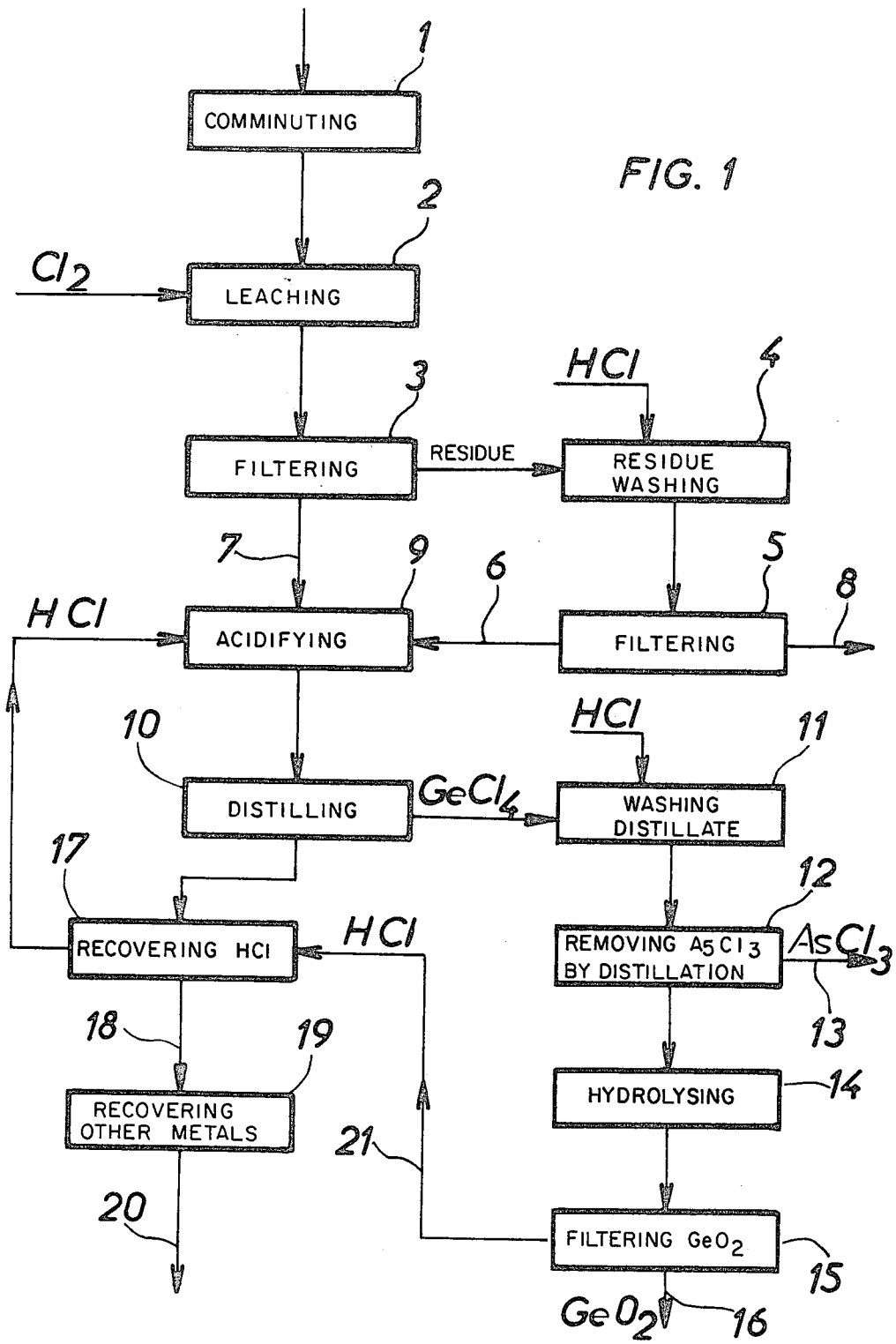

United States Patent [19]

Lebleu et al.

[11] 4,090,871
[45] May 23, 1978

[54] PROCESS FOR THE RECOVERY AND PURIFICATION OF GERMANIUM FROM ZINC ORES

[75] Inventors: Albert Lebleu, Courcelles-les-Lens; Paul Fossi, Elancourt; Jean-Michel Demarthe, Viroflay, all of France

[73] Assignee: Societe Miniere et Metallurgique de Penarroya, Paris, France

[21] Appl. No.: 703,707

[22] Filed: Jul. 8, 1976

[30] Foreign Application Priority Data

Jul. 8, 1975 France .............................. 75 21327

[51] Int. Cl.$^2$ ...................... C01G 17/02; C01G 17/04
[52] U.S. Cl. ......................................... 75/84.5; 75/86; 423/92; 423/98
[58] Field of Search ................ 75/86, 88, 101 R, 114, 75/121; 423/92, 98, 494, 618, 94, 107, 108

[56] References Cited

U.S. PATENT DOCUMENTS

| | | | |
|---|---|---|---|
| 1,905,460 | 4/1933 | Gamichon | 423/98 |
| 2,767,052 | 10/1956 | Harner et al. | 423/494 |
| 2,786,750 | 3/1957 | Inagaki | 423/92 |
| 2,835,569 | 5/1958 | Reynaud et al. | 75/114 |
| 2,920,951 | 1/1960 | Bretschneider et al. | 75/86 |
| 3,981,962 | 9/1976 | Smyres et al. | 75/119 |

FOREIGN PATENT DOCUMENTS

| | | |
|---|---|---|
| 1,324,877 | 3/1963 | France. |
| 785,751 | 11/1957 | United Kingdom. |

OTHER PUBLICATIONS

Gable, "Extraction of Germanium From Germanium--bearing Spelter-retort Residues," Rec. Trav. Chim. 52, 225-228 (1933).

Primary Examiner—O. R. Vertiz
Assistant Examiner—Wayne A. Langel
Attorney, Agent, or Firm—Fleit & Jacobson

[57] ABSTRACT

The invention provides a process for recovering germanium as germanium oxide from a germaniferous metallic zinc which involves distilling the germaniferous metallic zinc under non-oxidizing conditions, recovering the distillation residue which contains the germanium, leaching the recovered distillation residue with chlorine water to convert the germanium into germanium tetrachloride, hydrolyzing the germanium tetrachloride into germanium oxide, and recovering the germanium oxide. Optionally, the germanium oxide may be reduced to metallic germanium, if desired.

40 Claims, 2 Drawing Figures

PROCESS FOR THE RECOVERY AND PURIFICATION OF GERMANIUM FROM ZINC ORES

The present invention relates to the recovery of the germanium contained in very small proportions in zinc ores, the germanium being recovered in the form of one of its compounds; and to the purification of the thus recovered germanium compound until a high purity useful product is obtained.

The process according to the invention leads to germanium oxide ($GeO_2$), which can then be reduced to metallic germanium by any known process. The reduction stage will not be described hereinafter because it is conventional and does not form part of the present invention.

The essential object of the present invention is therefore the recovery of high purity germanium oxide $GeO_2$, whereby the recovered product can be used as it is or converted to metallic germanium values, or it can undergo any known reaction to convert it into a commercially interesting germanium compound.

A large number of different processes are known for producing germanium but they all have a certain number of disadvantages. Thus, those which involve leaching by hydrochloric acid can often give rise to the formation of arsine ($AsH_3$ — an extremely toxic gas) from the arsenic which is often present in the germaniferous concentrate to be treated. Moreover, these know processes give rise to very acid solutions which lead to difficult effluent treatment problems.

Thus, one of the aims of the present invention is to provide a process for obtaining germanium from zinc ores which does not have the disadvantages of the known processes and which in particular does not lead to the formation of arsine.

Another aim of the invention is to provide a process according to which more germanium is recovered from the starting ore than it is possible with known processes, and the performance of which process involves the consumption of a minimum quality of additives, which additives are as inexpensive as possible.

A further aim of the invention is to provide a process which produces high purity germanium, i.e., containing at least 99.90% of the theoretical or stoichiometric value.

According to the invention there is provided a process of the type described hereinbefore which comprises successively the following steps:

(a) removing zinc from the tails of distillation columns in a plant for the refining of zinc from its ores;

(b) distillation under non-oxidising conditions of the zinc removed in step (a);

(c) recovery of the distillation residue obtained from step (b);

(d) leaching the distillation residue with chlorine water to form germanium tetrachloride;

(e) recovery of the germanium tetrachloride;

(f) hydrolysis of the germanium tetrachloride into germanium oxide; and (g) optional reduction of the germanium oxide into metallic germanium.

The first treatment step according to the invention, (i.e. step (a) — the removal of the zinc from the tails of distillation columns in industrial plants for the production of zinc from its ores) is recommended according to the invention because in surprising manner the germanium accumulates at a clearly defined point in these plants.

More specifically, it is known that plants for the production of zinc from its ores comprise a series of treatment installations leading to the recovery of impure zinc (these installations are extensively described in technical literature and will not be discussed here), whereby this impure zinc is then refined by distillation in a succession of carborundum columns, so-called "reboiling columns". It is here that we have discovered that germanium accumulates (as has been shown by mumerous tests which we have performed).

As an example, starting with a zinc ore whose average germanium content is of the order of 30 grams per metric ton, i.e. 0.003%, it is found that the germanium concentration in zinc removed from the end of the "reboiling columns" varies between approximately 0.6 and 0.8%.

Thus, according to the invention, it is at this point that the germaniferous zinc is removed and, as stated above, it is then distilled under non-oxidising conditions in step (b). Preferably this operation is performed in a vacuum distilling furnace which is advantageously of the type described in French Pat. No. 1,133,468.

Reference should be made to the Specification of this Patent for a detailed description, and it is merely pointed out here that such a furnace essentially comprises a cylindrical briquetted chamber on the one hand and a condenser for recovering the zinc cooled by the circulation of water on the other, the two portions being interconnected by a short tube of large diameter. Moreover, a vacuum pump sucks the atmosphere from the furnace through a dust filter, whereby during operation the vacuum is of the order of 2 to 10 mm of mercury. Finally, the heat necessary for the distillation is supplied by graphite needles connected to a power source.

The operation of such a furnace will be described hereinafter, but it should be noted at this stage that the fact that it operates under vacuum prevents oxidation both of the zinc vapours and of the residue which would make the latter insoluble in chlorine water and therefore unsuitable for the following leaching stage. However, it is obvious that the same result would be obtained if instead of working under vacuum the distillation of the zinc vapours was carried out in an inert atmosphere.

After recovery of the distillation residue in step (c) the following step (step (d)) comprises leaching of the distillation residue by means of chlorine water at a temperature which is preferably between 50° and 80° C.

This leaching process results in the conversion of germanium into germanium tetrachloride ($GeCl_4$) with an excellent yield. In this connection, it is stressed that the leaching converts the arsenic into arsenic acid $AsO_4H_3$, whereas the conventional processes involving leaching by hydrochloric acid transform it into arsine ($AsH_3$) and arsenious chloride ($AsCl_3$). The conventional processes thus have the double disadvantages that the arsine is very toxic, as stated hereinbefore, and that the arsenious chloride has a boiling point very close to that of germanium tetrachloride, making necessary several fractional distillation processes for separating one from the other.

Preferably, the distillation residue is pulverized before leaching to a relatively fine grain size, i.e. at the most equal to 2 mm.

It has surprisingly been found that the actual leaching process can be advantageously performed in a brine of an alkaline or alkaline earth metal chloride which is preferably calcium chloride. The concentration of the latter in the bath can be between 3 and 6 moles per liter and is preferably close to 4 moles per liter, whilst the acidity of the bath is advantageously at the most equal to 2 free acid values per liter (i.e. up to 2N).

The interest of using such a bath is essentially due to the fact that it is thus possible to increase the solubilisation of the metals (particularly germanium) contained in the starting material, without, however, greatly increasing the free acidity of the solution. Thus, the final acidity necessary for complete dissolution of the germanium in the absence of alkaline earth chloride is greater than 6N and usually is of the order of 9N, necessitating a costly and incomplete recovery of the excess acid added.

Preferably the alkaline earth chloride bath is recycled, a drain being provided however to eliminate the excess resulting from the products consumed.

Two embodiments of the following step (i.e. step (e)) — recovery of germanium tetrachloride) will now be described.

In a first embodiment, the germanium tetrachloride extraction is obtained by liquid-liquid exchange by contacting the leaching solution with an organic phase containing a suitable solvent.

Preferably, this solvent is an industrial product constituted by aromatic fractions having a high flash point and low cost such as those sold under the trade names "Solvesso 150" and "Solvant 200 Esso". "Solvesso 150" is an oil distillation fraction having a density of 0.892 at 15° C; an initial distillation point of 187° C and a final distillation point of 212° C; a flash point of 66° C, as determined by the Abel Tester in a closed cup; a content of 99% by volume of aromatic hydrocarbons; an aniline point of 18.5° C; a kauri-butanol value of 94; a corrosion value of less than 1a under the ASTM taken for 3 hours at 100° C; and a negative result under the doctor test. "Solvant 200 Esso" is an oil fraction having a density of 0.900 at 15° C; an initial distillation point of 220° C and a final distillation point of 292° C; a flash point of 108° C, as determined by the Abel tester in a closed cup; a content of 98% by volume of aromatic hydrocarbons; an aniline point of 16° C; a kauri-butanol value of 93; a corrosion value of less than 1a under the ASTM taken for 3 hours at 100° C; and a negative result under the doctor test.

The re-extraction of the germanium tetrachloride distilled over in the organic phase may be carried out by contacting the latter with an aqueous re-extraction phase (step (b)). This aqueous phase can comprise water in which the germanium oxide $GeO_2$ precipitates spontaneously and this can be easily recovered, e.g. by filtration.

The initial aqueous phase from which the germanium tetrachloride has been extracted by liquid-liquid exchange can be neutralised, e.g. with lime in the case where a calcium chloride bath is used, and then filtered to eliminate from it, in the form of hydroxides, the heavy metals contained therein, whereby the latter can be recovered. Finally, the solution obtained can be recycled to the leaching step as stated hereinbefore following draining to eliminate any excess of alkaline earth chloride.

In a second embodiment, the germanium tetrachloride contained in the leaching solution is extracted by direct distillation after acidification of the solution by means of hydrochloric acid up to an acidity of about 2N.

The thus recovered germanium tetrachloride is preferably washed with hydrochloric acid, purified by fractional distillation and then hydrolysed (step (f)) to yield germanium oxide $GeO_2$.

The solution from which the germanium tetrachloride has been extracted can be treated in order to eliminate therefrom the other metals which it contains, whereby the latter can be recovered whilst the thus purified solution can be recycled upstream in the process, as will be described hereinafter.

Figure 2:
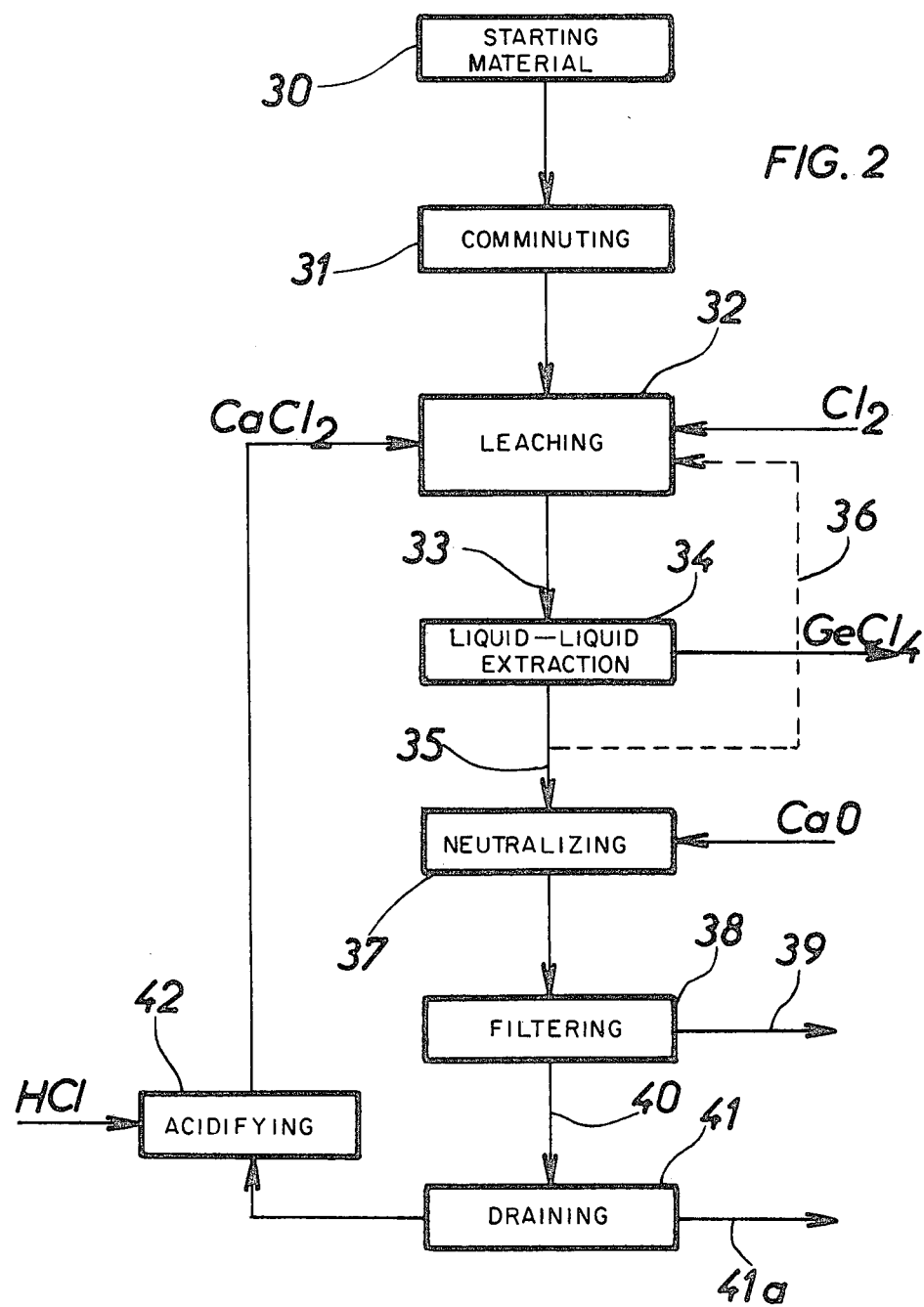

The following non-limitative description will provide a better understanding of how the present invention can be put into practice. Reference will be made to the following drawings, wherein:

FIG. 1, in an extremely schematic manner, shows various steps of the process according to the invention in one of its embodiments;

FIG. 2, analogous to FIG. 1 but corresponding to another embodiment of the process of the invention.

These two embodiments comprise a first step not shown in the drawings from which is obtained a germaniferous residue. This is the first step which will be described.

As stated hereinbefore, the starting product for the process of the invention is zinc ore which in a first step is converted into impure zinc by a conventional process which will not be described here and which essentially comprises roasting and blast-furnace treatment.

The refining of this impure zinc is performed by distillation in a succession of columns called "reboiling columns" and according to the invention, it is from the end of these columns that the zinc is removed for the purpose of extracting the germanium contained therein. A typical analysis of this zinc is as follows:

Pb : 3.20%
Ge : 0.78%
Al : 0.55%
Fe : 0.05%
Cu : 1.6%
Zn : the remainder.

This impure metal is then treated by distillation in vacuo in a furnace of a type analogous to that described hereinbefore. The following example indicates in a non-limitative manner the operating procedure used and the results obtained during a real test.

EXAMPLE I

Firstly, 15,630 kg of zinc removed from the end of "reboiling columns" and containing 0.98% of germanium is introduced into the furnace.

Treatment is performed in 10 successive operations, each corresponding to a charge of about 1,500 kg. The composition of each charge is given by the following table.

| Operation no. | Pb % | Fe g/l | Sn % | Cu % | Al % | As g/l | Sb g/l | Ag g/l |
|---|---|---|---|---|---|---|---|---|
| 1 | 2.98 | 145 | 2.25 | 1.6 | 0.34 | 190 | 980 | 500 |
| 2 | 2.75 | 91 | 2.7 | 1.6 | 0.33 | 150 | 1040 | 500 |
| 3 | 2.45 | 136 | 2.50 | 1.45 | 0.34 | 137 | 990 | 505 |
| 4 | 2.72 | 103 | 2.66 | 1.45 | 0.34 | 157 | 980 | 520 |
| 5 | 2.07 | 71 | 2.50 | 1.40 | 0.37 | 140 | 960 | 465 |
| 6 | 2.57 | 76 | 2.54 | 1.45 | 0.34 | 137 | 960 | 490 |
| 7 | 2.80 | 71 | 2.74 | 1.50 | 0.40 | 157 | 870 | 540 |
| 8 | 2.71 | 120 | 2.66 | 1.50 | 0.37 | 150 | 970 | 515 |
| 9 | 2.48 | 68 | 2.26 | 1.56 | 0.42 | 122 | 755 | 505 |

-continued

| Operation no. | Pb % | Fe g/l | Sn % | Cu % | Al % | As g/l | Sb g/l | Ag g/l |
|---|---|---|---|---|---|---|---|---|
| 10 | 2.83 | 107 | 2.20 | 1.45 | 0.37 | 150 | 1000 | 460 |

Each successive operation comprises the following steps:

1. The furnace heated to a temperature of about 800° C is charged with about 1,500 kg of material per operation.
2. The furnace is sealed, placed under vacuum and an electrical heating system is started up.
3. The zinc is distilled for about 10 hours. During this stage the distillation is regulated as a function of the condenser temperature. At the end of the first two hours of heating the condenser temperature reaches about 450° C, which indicates that the zinc is starting to distil and it is then possible to allow water to flow over the condenser to improve the heat transfer.

Distillation continues while the temperature of the zinc bath of the condenser is in excess of 500° C. At the end of about 10 hours the charge is exhausted, the vaporised zinc flow decreases, the temperature of the zinc bath in the condenser drops and the temperature of the arched roof of the furnace increases.

4. When the bath temperature drops below about 500° C, i.e. a temperature of about 1050° C for the arched roof of the furnace, heating is stopped and the apparatus is again placed under the atmospheric pressure, followed by running off the distillate.
5. In view of the fact that the residue only represents about 10% by weight of the material initially introduced, it is not necessary to run off this residue after each operation.

Thus in the example chosen, only four running off operations were required for the ten operations.

The running off operations are preceded by skimming off the dross which has a high melting point and this is pulverised. The liquid part is either made into ingots for subsequent pulverisation or directly granulated for obtaining a desired grain size distribution with a view to subsequent treatment.

The ten operations are summarised as follows:

| Operation No. | Zinc charge (kg) | Distillate Liquid distillate (kg) | Condenser oxides (kg) | Distillation residue run off (kg) | Intermetallic phases skimmed off from furnace | Duration |
|---|---|---|---|---|---|---|
| 1 | 1598 | 1312 | 40 | — | — | 11h.00 |
| 2 | 1602 | 1335 | 40 | 217 | 0 | 14h.30 |
| 3 | 1515 | 1330 | 40 | — | — | 13h.20 |
| 4 | 1546 | 1370 | 35 | — | — | 13h.40 |
| 5 | 1615 | 1420 | 35 | 235 | 0 | 14h.15 |
| 6 | 1537 | 1330 | 41 | — | — | 15h.15 |
| 7 | 1579 | 1400 | 37 | 112.2 | 49.7 | 14h.45 |
| 8 | 1573 | 1320 | 51 | — | — | 14h.15 |
| 9 | 1339 | 1300 | 36 | — | — | 12h.50 |
| 10 | 1726 | 1440 | 67 | 365 | 55 | 13h.45 |
| Total | 15630 | 13557 | 422 | 929.2 | 104.7 | |

→ 15013

(initially in the furnace = 0)
N.B. Not drawn off residue remaining in the furnace: 617 kg.

The germanium balance of these operations is as follows:

| | Charge | Liquid distillate | "Oxides" | Distillation residue | Intermetallic phases |
|---|---|---|---|---|---|
| % Ge | 0.98 | 0.0116 | 0.0002 | 8.08 | 8.48 |
| Ge weight (kg) | 153.174 | 1.572 | 0.001 | 75.063 | 8.862 |

→ 85.498

N.B. Non-drawn off residue remaining in furance: 67.67 kg.

The distilled zinc contains 116 g/t of germanium, i.e. about 1% of the germanium introduced.

Radiocrystallographic and electronic microscopic examinations show that the germanium present in the residue with a concentration factor of the order of 10 is well crystallised and in the metallic state.

The following table gives the composition of the various distillates obtained:

| Operation no. | Pb % | Fe g/t | Sn g/t | Cu g/t | Al g/t | As g/t | Sb g/t | Ag g/t |
|---|---|---|---|---|---|---|---|---|
| 1 | 0.71 | 19 | 132 | 176 | 3 | 38 | 11 | 285 |
| 2 | 1.14 | 15 | 480 | 335 | 12 | 40 | 19 | 283 |
| 3 | 1.07 | 30 | 860 | 420 | 52 | 40 | 83 | 350 |
| 4 | 1.50 | 31 | 1100 | 1000 | 175 | 12 | 103 | 630 |
| 5 | 1.46 | 32 | 960 | 1000 | 163 | 21 | 90 | 490 |
| 6 | 2.77 | 83 | 6700 | 6000 | 845 | 95 | 522 | 1350 |
| 7 | 1.66 | 45 | 1175 | 1200 | 215 | 28 | 126 | 525 |
| 8 | 1.48 | 39 | 1410 | 1500 | 360 | 23 | 137 | 470 |
| 9 | 1.55 | 30 | 900 | 1000 | 164 | 1 | 90 | 308 |
| 10 | 1.65 | 40 | 1075 | 1000 | 230 | 15 | 103 | 326 |

By comparison with the table giving the composition of the charges, it can be seen that a residue is obtained which is greatly enriched in germanium and in all the non-volatile elements, whilst they have been virtually completely removed from the distilled zinc.

The following description refers to the hydrometallurgical treatment of the residue.

The first embodiment shown schematically in FIG. 1 will be described first.

At 1 the residue is extensively pulverised so that there is a good action of the chlorine on the particles during the subsequent leaching operation.

The subsequent chlorine leaching step is designated by reference numeral 2 in the drawing. It takes place, for example, in a corrosion-resistant reactor, which is either briquetted or vitrified accompanied by an adequate agitation to ensure that the residue particles remain in suspension in the aqueous solution in the reactor. As stated hereinbefore, this solution is preferably a calcium chloride bath. The chlorine is diffused into the bottom of the reactor and the solution is kept at a temperature of 60° to 70° C.

The residue is then filtered at 3 and washed at 4, either by a hydrochloric acid solution, as indicated on the drawing, or by a sodium chloride bath in order to solubilise the chlorides such as silver chloride and lead chloride which could entrain germanium into the residue.

This is followed by filtration at 5 to yield a washing solution 6 which is combined with a filtrate 7 of the leaching process, and a sterile residue 8 which is discarded.

The two mixed solutions 6 and 7 are acidified at 9 with hydrochloric acid so that the concentration of the mixture reaches and even exceeds 9 gram equivalents of acid per liter. Thus, in practice, at least 330 gram of HCl per liter must be added. However, if the leaching solution is a calcium chloride bath, a much lower acidity is sufficient as stated hereinbefore.

In the following step 10 the germanium tetrachloride ($GeCl_4$) formed during the acidification 9 is distilled. To this end the solution is raised to a temperature close to boiling. The tetrachloride is distilled and it is condensed in an exchanger vigorously cooled by a bath at a temperature of about 0° C.

The tetrachloride obtained is washed at 11 by means of a hydrochloric (acid) solution and is then purified at 12 by distillation in order to recover at 13 the entrained arsenious chloride. The thus purified tetrachloride is mixed at 14 with very pure water (i.e. water which had been subjected to ion-exchange treatment and passed over activated charcoal) and it is hydrolysed giving germanium oxide ($GeO_2$) and hydrochloric acid.

At 15 the germanium oxide is filtered, washed and dried in a stove at 200° C. At 16 germanium oxide is obtained in crystalline form. However, it can be converted to the amorphous oxide by melting in a furnace at a temperature above 1600° C.

The acid solution 10 remaining after distillation of the germanium tetrachloride is treated at 17 to recover the hydrochloric acid which is recycled to the acidification step 9. The residue designated by 18 is a solution containing chlorides of various metals such as copper, zinc, aluminium, iron, arsenic, silver, lead, tin, antimony and an alkaline earth metal, as applicable. This solution can be treated at 19 to recover at 20 those metals such as copper and silver which have an adequate commercial value.

The solution 21 resulting from the treatment 20 of the germanium oxide contains hydrochloric acid and the latter is passed to stage 17 for the recovery of this acid.

Examples II and III below relate in the first case to the leaching step 2 and the second to step 10 for the distillation of the germanium tetrachloride from the leaching solution.

EXAMPLE II 200 grams of the zinc distillation residue are pulverised to a grain size below 250 microns and these are introduced with 2 liters of water and 10 ml of 10N hydrochloric acid into a glass reactor with a capacity of 2.5 liters equipped with a stirrer, a thermometer and a gaseous chlorine injection tube.

Chlorine is injected into this pulp for 4 hours accompanied by stirring, the chlorine flow rate being about 110 grams per hour. In two hours the temperature rises up to 60° C and it is maintained at this value. After stopping the reaction and cooling to 40° C, the mixture is filtered and the resulting solution is analysed. After a first washing with water, the residue is washed twice with a solution containing 200 grams of sodium chloride per liter, each washing operation lasting 2 hours. The purpose of this operation is to solubilise the crystallised insoluble chlorides such as lead chloride and silver chloride which are present in the residue.

It should be noted that the final residue washed contains no more than 0.03% of germanium and that the overall dissolution yield of this metal is 99.1%.

EXAMPLE III 700 ml of the filtered leaching solution resulting from the operations of Example II are removed, and this contains 1.8 g of germanium per liter. These are introduced into a distillation flask with 1300 ml of 11N hydrochloric acid in such a way that the acidity of the mixture is equal to 7.15N.

The solution is heated to a temperature of 100° C and is maintained at this temperature for one hour. The fractions which distil are collected and are washed with a 1N soda solution in order to convert the germanium tetrachloride into germanium oxide and in order to avoid any loss by evaporation.

It is found that the tetrachloride distillation yield is equal to 97% so that the overall germanium recovery yield from the initial metallic residue is 96%.

The second embodiment of the process of the invention will now be described with reference to FIG. 2, whereby it is understood that the first stage of this process, i.e., the production of the germaniferous residue by distilling the impure zinc is common to both embodiments and will not be described again.

The starting material indicated by the reference numeral 30 on the drawing is first pulversied at 31, followed by leaching 32 using chlorine in an aqueous medium. More specifically, this leaching process preferably takes place when the particles of germanium residue are in suspension, accompanied by stirring in an alkaline earth chloride bath which is advantageously calcium chloride ($CaCl_2$). The concentration of this calcium chloride bath can vary relatively widely, but as stated hereinbefore, it is preferably close to 4 moles per liter for a free acidity at the most equal to two normalities (equivalents). This latter value can be obtained by adding hydrochloric acid to the bath (the source of this acid will be indicated hereinafter).

During the leaching process 32 the temperature of the reactive medium must be between 50° C and the boiling temperature. However, it is preferable to operate at a temperature below 80° C because distillation of the germaniumm tetrachloride formed occurs as from this temperature.

Germanium tetrachloride formed during the leaching stage 32 is then extracted from the leaching solution 33 by liquid-liquid extraction 34. This operation is performed by contacting solution 33 with an organic extraction phase constituted by a solvent which is preferably an industrial aromatic hydrocarbon fraction, such as those sold under the trade names "Solvesso 150" or "Solvant 200 Esso". The extraction yield can reach 99% in one stage.

The re-extraction of the germanium tetrachloride which has passed into the organic extraction phase during step 34 can be performed by simply washing with water. Under these conditions the tetrachloride hydrolyses and the germanium oxide precipitates. It is then sufficient to filter to recover this oxide whilst the organic phase is immediately usable for performing the germanium tetrachloride extraction on fresh quantities of solution 33.

To be performed, with a good yield, i.e. with minimum losses in the aqueous and organic phases, the re-extraction must be performed with a ratio between the volume of the organic phase and that of the aqueous phase, or O/A ratio, such that the final acidity developed by the hydrolysis reaches about 5N. For example, on considering an organic phase containing 12 grams of germanium per liter, re-extraction must be performed with an O/A ratio equal to 0.13 so that the final acidity is between 5N and 6N.

The performance of the extraction and re-extraction steps will not be described in detail here because it is well known by those skilled in the art. It is merely pointed out that these stages can be performed, preferably in counter-current, in compartmental apparatuses of the mixer-decanter type or in packed columns, plate columns or pulsed columns or in multi-stage centrifugal extractors or even in multiple hydrocyclones.

The aqueous solution 35 from the extraction stage 34 which is thus freed from the germanium which it contained can be partially recycled at 36 to the leaching process 32. It has, in fact, been found that there is a more or less long initial phase which precedes the starting of the actual leaching process, making it necessary to reduce the chlorine flow when it is desired to avoid large losses of this gas. However, this initial phase is eliminated when carrying out a partial recycling 36 which is equal to or less than 10% of the flow of solution 35.

Solution 35 is then neutralised at 37, preferably with lime, followed by filtration 38 which yields a solid residue 39 which can be treated to recover the metals of value which it contains, and on the other a solution 40 which is recycled to the leaching step 32.

However, prior to this recycling, it is necessary to eliminate excess calcium chloride $CaCl_2$ 41a contained in solution 40 by draining 41. In actual fact, the reagents used, i.e., essentially chlorine and lime, react with one another to give calcium chloride whose concentration thus increases over a period of time and it must be kept at a constant level by means of the drain 41.

Moreover, before recycling solution 40 relative to the leaching step 32, its pH, i.e., its acidity, must be brought to the initial value, this value having been considerably changed during the neutralisation process 37. To this end hydrochloric acid is added to the solution 40 at 42.

Finally, in connection with the composition of the bath used in the leaching step 32, it is pointed out that calcium chloride is not the only alkaline or alkaline earth chloride which can be used, since we have established that lithium chloride and magnesium chloride give useful results. However, for economic reasons, calcium chloride is preferred and therefore the appropriate steps in the following examples were all performed with this chloride.

EXAMPLE IV

This example relates to the leaching step of the germaniferous residue schematically shown at 3 (2) in FIG. 1 and at 32 in FIG. 2, and more particularly serves to show the influence of the calcium chloride concentration on the leaching process yield.

For this purpose, three different leaching processes are performed, each relating to 150 grams of germaniferous residue whose composition is as follows:

Pb : 18.5%
Ge : 3.3%
Sn : 37.2%
Cu : 10.2%
Zn : 17.4%

Both the temperature and chlorine flow are the same for each leaching process. The values of these parameters are not given here because the tests are of a comparative nature.

The results obtained are given in the following table:

| Test No. | | $CaCl_2$ (moles/l) | Test duration | Post-leaching residue weight (g) | Residue composition (%) | | | | |
|---|---|---|---|---|---|---|---|---|---|
| | | | | | Pb | Ge | Sn | Cu | Zn |
| 1 | Residue % | 3.2 | 6h75 | 18.45 | 51 | 4.5 | 0.43 | 0.55 | 0.62 |
| | Leaching yield (%) | | | | 59 | 83.2 | 99.8 | 00.5 | 99.6 |
| 2 | Residue % | 4 | 7h10 | 16.70 | 44.2 | 2.1 | 0.15 | 0.22 | 0.31 |
| | Leaching yield (%) | | | | 67 | 93 | 99.9 | 99.8 | 99.8 |
| 3 | Residue % | 4.5 | 8h15 | #0 | | | | | |
| | Leaching yield (%) | | | | #100 | 100 | #100 | #100 | #100 |

It can be seen that leaching is virtually complete when the concentration of the calcium chloride bath reaches 4 moles per liter.

EXAMPLE V

This example also relates to the leaching step and refers more specifically to the study of the reaction kinetics.

For this purpose 500 ml of a bath containing 4.5 moles of calcium chloride per liter is used and 90 g of a germaniferous residue is suspended in the bath. The composition of the residue is as follows:

Pb : 14.7%
Ge : 10.6%
Sn : 36.5%
Cu : 22.5%
Zn : 1.92%
Al : 3.58%

The leaching reaction is performed in a reactor having a double jacket where the temperature is maintained at 80° C by circulating water. Moreover, gaseous chlorine is introduced into this reactor at a rate of 27.5 g/h.

At the end of an approximately 4 hour leaching period the chlorine starts to escape. The solution is then filtered, washed and the residue remaining is weighed.

The same operation is repeated, but leaching is interrupted after 30 minutes, 1 hour, 2 hours and 3 hours. The following table gives, as a function of the leaching time, the quantity of residue which was not leached, this value being expressed as a percentage relative to the initial weight of the germaniferous residue treated.

| Duration (hours) | 0 | 0.5 | 1 | 2 | 3 | 4 |
|---|---|---|---|---|---|---|
| Residue remaining (%) | 100 | 70.2 | 35.2 | 24.3 | 5.7 | 2.4 |

It can be seen that almost all the residue is leached after four hours under the test conditions.

EXAMPLE VI

The object of this example is to show the influence on the leaching reaction of the addition of an initiating agent.

For this purpose, a test similar to that of Example V is performed, but at the start of the reaction a small volume of a solution is added which is obtained from a previous leaching process and which in solution contains metals such as cupric copper and zinc $Zn^{++}$.

More specifically, 150 grams of germaniferous residue are suspended in 800 ml of a bath containing 4 moles of calcium chloride per liter, and to this bath are added 80 ml of a solution containing, inter alia, 25 grams per liter of $Cu^{++}$ ions in the form of chloride. The flow of chlorine injected into the leaching solution is equal to 27.5 g/h and it is found that there is no escape of chlorine, the reaction being complete in $7\frac{1}{2}$ hours.

Thus, the addition of an initiating agent makes it possible to use in a more rational manner the chlorine injected into the leaching solution because there is no escape of product up to its total dissolution.

EXAMPLE VII

This example relates to the step of direct distillation of germanium tetrachloride from a concentrated calcium chloride leaching solution having a low free acidity. This stage is indicated by the reference numeral 10 in FIG. 1.

Various synthetic solutions of germanium tetrachloride ($GeCl_4$) having various acidities and various calcium chloride concentrations are distilled. The duration of each distillation is one hour.

The following table gives as a function of the acidity of the solution and its calcium chloride content the distillation yield expressed as a percentage. The yield value 100 corresponds to total distillation.

| $HCl_{(moles/l)}$ $CaCl_{2(moles/l)}$ | 1 | 2 | 4 | 6.5 |
|---|---|---|---|---|
| 1 | 0 | 0 | 0 | # 100 |
| 2 | 0 | 0 | 0 | # 100 |
| 3 | 0 | 0 | 19.8 | // 100 |
| 4 | 2.4 | 7.75 | 31.06 | // 100 |
| 5 | 2.4 | 31.0 | // 100 | — |
| 6 | 6.4 | // 100 | // 100 | — |

It can be seen that for distillation periods of about one hour, germanium tetrachloride recovery, in the absence of calcium chloride, is only effective for hydrochloric acid concentrations greater than 6N. For lower values the concentration of calcium chloride necessary increases in inverse proportion to the free acidity.

EXAMPLE VIII

In this example, both the leaching and distillation steps are studied. The starting material is a germaniferous residue whose composition is as follows:

Pb : 14.7%: Cu : 22.5%: Sn : 36.5%: Zn : 1.92%: Al : 3.6%: Ge : 10.06%.

150 grams of this starting material suspended in a bath containing 4.5 moles of calcium chloride per liter are leached with chlorine. After total dissolution the solution is acidified with hydrochloric acid at various acidity levels and the germanium tetrachloride contained in this solution is distilled.

The following table indicates as a function of the acidity the quantity of germanium tetrachloride distilled in 15 minutes.

| Added acidity moles/l | 0 | 0.25 | 0.5 | 0.75 | 1 | 1.25 | 1.50 | 1.75 | 2 |
|---|---|---|---|---|---|---|---|---|---|
| $GeCl_4$ distilled in 15 min. (%) | 25 | 29 | 43.5 | 60.5 | 74 | 87 | 88 | 94 | 96 |

Thus, under the test conditions the germanium tetrachloride distillation is almost total as soon as the acidity reaches a value close to 2 moles per liter.

EXAMPLE IX

This example, as well as the following examples, relate to the operating procedure of FIG. 2, i.e., the case where the germanium tetrachloride is extracted from the leaching solution by means of an organic solvent.

More specifically, the present example relates to the extraction stage designated by the reference numeral 34 in FIG. 2.

100 ml of the organic solvent sold under the trade mark "Solvesso 150" and 100 ml of an aqueous phase whose free acidity is 2N, which contains 2 grams of germanium per liter and whose calcium chloride content varies between 4 and 9 moles per liter are introduced into separating funnels.

The contents of the funnel are stirred for 10 minutes and left to decant for 10 further minutes, followed by centrifuging of the organic phase.

The following table indicates for each concentration of the initial aqueous phase the germanium content in the said aqueous phase and in the organic phase, as well as the value of the extraction coefficient $K_D$ (a measure of the extraction yield which is defined as the ratio between the germanium content in the organic extraction phase and the germanium content remaining in the initial aqueous phase after extraction).

| $CaCl_2$ concentration (moles/l) | Aqueous phase Ge (g/l) | Organic phase Ge (g/l) | $K_D$ |
|---|---|---|---|
| 2 | 1.84 | 0.018 | $9 \times 10^{-3}$ |
| 3 | 0.48 | 1.59 | 3.3 |
| 3.5 | 0.022 | 2.03 | $10^2$ |
| 4 | 0.022 | 2.03 | $10^2$ |
| 4.5 | 0.022 | 2.08 | $10^2$ |

It can be seen that the extraction coefficient becomes excellent as soon as the calcium chloride content of the initial aqueous solution reaches a value of about 3.5 moles per liter.

EXAMPLE X

This example illustrates the same stage of the process as Example IX and it is intended to show the influence of the free acidity content of the initial aqueous solution.

For this purpose, a solution is used resulting from leaching by chlorine of a germaniferous residue having the following approximate composition:

Ge: 1.45 g/l
Pb: 25 g/l
Zn: 25 g/l
Cu: 25 g/l
Al: 4 g/l
Sn: 50 g/l
$CaCl_2$: 4 M 12.5N hydrochloric acid is added to this solution in quantities such that solutions are obtained containing respectively 3, 2, 1 and 0.5H$^+$ gram ions per liter.

A certain number of successive equilibria is produced with each of these solutions in 500 ml separating funnels. To obtain each of these, stirring takes place for 10 minutes, followed by decanting for a further 10 minutes and then separation of the organic phase by centrifuging. These equilibria are as follows:

(1) Equilibrium between 250 ml of the organic solvent sold under the trade name "Solvesso 150" and 100 ml of fresh aqueous phase.

(2) Equilibrium between 200 ml of the charged organic phase obtained during equilibrium (1) and 100 ml of fresh aqueous phase.

(3) Equilibrium between 150 ml of the organic phase resulting from the preceding step and 100 ml of fresh aqueous phase.

(4) Equilibrium between 100 ml of organic phase produced in equilibrium (3) and 100 ml of fresh aqueous solution.

The reason for these successive equilibria is to effect an extraction by contacting a charged solvent with an aqueous phase having a low germanium content.

The following table indicates for each free acidity value in the initial aqueous solution and for each of the above equilibria 1 to 4 the germanium content in the aqueous phase and the germanium content in the organic phase, together with the value for the extraction coefficient $K_D$.

| Free acidity | Aqueous phase Ge(mg/l) | Organic phase Ge(g/l) | $K_D$ |
| --- | --- | --- | --- |
| 3N | 7 | 0.50 | 71 |
|  | 8 | 1.08 | 135 |
|  | 9 | 1.88 | 209 |
|  | 10 | 2.82 | 282 |
| 2N | 10 | 0.56 | 56 |
|  | 14 | 1.28 | 91 |
|  | 15 | 2.12 | 141 |
|  | 18 | 3.28 | 182 |
| 1N | 27 | 0.62 | 23 |
|  | 28 | 1.34 | 48 |
|  | 31 | 2.30 | 74 |
|  | 32 | 3.58 | 112 |
| 0.5N | 48 | 0.66 | 13.7 |
|  | 63 | 1.40 | 22 |
|  | 78 | 2.36 | 30 |
|  | 107 | 3.62 | 34 |

It can be seen that the extraction coefficient $K_D$ regularly decreases when the free acidity drops from 3N to 0.5N and that at constant free acidity the extraction coeficient rises when the germanium content increases. The latter phenomenon is accentuated as the acidity drops.

However, it is clear to those skilled in the art that germanium extraction remains excellent even at low acidity under the operating conditions described hereinbefore.

In fact, it is merely necessary to increase the number of extraction steps to obtain a high germanium recovery level. Thus, with two extraction steps, the ratio between the volume of the organic phase and that of the aqueous phase being equal to unity for each of them, and the initial aqueous phase containing 5 grams of germanium per liter:

(1) with a free acidity equal to 0.5 gram ions per liter, the germanium content in the final spent aqueous phase is below 50 mg/l, i.e., a germanium recovery level exceeding 99%, (2) with a free acidity equal to 2 gram ions per liter, the germanium content in the final spent aqueous phase is below 5 mg/l, corresponding to a germanium extraction level exceeding 99.9%.

EXAMPLE XI

This example permits a comparison between two organic solvents, one being sold under the trade name "Solvesso 150" and the other sold under the trade name "Solvant 200 Esso".

The reason for the present test is that the second of these solvents has a relatively high flash point, being equal to 180° C, whilst the flash point of the first is only 66° C. However, for heat balance reasons, it may be of interest to perform germanium tetrachloride extraction at a temperature close to 60° C, and at this temperature safety requirements make it necessary to use a solvent with a high flash point. For this reason the extraction yields obtained with "Solvesso 150" at 20° C on the one hand and "Solvant 200 Esso" at 60° C on the other were compared.

These comparative tests were performed under the operating conditions described in Example X.

The two following tables give the test results and in each case provide the extraction coefficient $K_D$.

| SOLVESSO 150- Extraction Temperature 20° C | Aqueous phase Ge (g/l) | Organic phase Ge (g/l) | $K_D$ |
| --- | --- | --- | --- |
|  | 0.005 | 0.022 | 4.4 |
|  | 0.034 | 0.185 | 5.5 |
|  | 0.124 | 1.46 | 11.6 |
|  | 0.58 | 8.2 | 14.1 |

| SOLVANT 200 ESSO Extraction Temperature 60° C | Aqueous phase Ge (g/l) | Organic phase Ge (g/l) | $K_D$ |
| --- | --- | --- | --- |
|  | 0.014 | 0.031 | 2 |
|  | 0.041 | 0.240 | 5.8 |
|  | 0.21 | 1.76 | 8.3 |
|  | 0.69 | 8.3 | 12 |

Comparison of these tables shows that it is possible to perform germanium tetrachloride extraction according to the invention at a temperature close to 60° C using the solvent called "Solvant 200 Esso" or some other solvent whose performance is identical and also having a high flash point.

EXAMPLE XII

It has been stated hereinbefore that according to the invention it is advantageous that the solution used relative to the leaching process by means of chlorine is a calcium chloride bath. However, it was also stated that other chlorides could be used, and the object of the present example is to demonstrate this.

For this purpose, two leaching solutions are used, the first containing calcium chloride at a rate of 4.5 moles per liter for a free acidity equal to 2N, and the second containing 4 moles per liter of magnesium chloride MgCl$_2$ for the same free acidity.

100 ml of these solutions are successively contacted with 100 ml of the solvent "Solvesso 150". Contact lasts 10 minutes accompanied by stirring, after which the solutions are left to decant for ten minutes, followed by centrifuging of the organic phase. The following table gives for each of the two aqueous solutions used the germanium content of the spent aqueous phase, the germanium content of the organic phase and the extraction coefficient $K_D$.

| Solution | Aqueous phase Ge (g/l) | Organic phase Ge (g/l) | $K_D$ |
|---|---|---|---|
| $CaCl_2$ | 0.020 | 5.82 | 291 |
| $MgCl_2$ | 0.005 | 0.24 | 48 |

Thus, a magnesium chloride bath permits a satisfactory extraction of germanium chloride although it is slightly less efficient than a calcium chloride bath.

What we claim is:

1. A process for the recovery of germanium as germanium oxide from germaniferous metallic zinc comprising:
   (a) distilling the germaniferous metallic zinc under non-oxidizing conditions;
   (b) recovering the distillation residue, which contains the germanium, obtained in step (a);
   (c) leaching the distillation residue recovered in step (b) with chlorine water to convert the germanium into germanium tetrachloride;
   (d) recovering the germanium tetrachloride from step (c);
   (e) hydrolyzing the germanium tetrachloride recovered in step (d) into germanium oxide; and
   (f) recovering the germanium oxide obtained in step (e).

2. The process of claim 1 wherein step (c) is carried out in an aqueous bath containing an alkaline metal chloride selected from the group consisting of an alkali metal chloride and an alkaline earth metal chloride.

3. The process of claim 2 wherein the alkaline earth metal chloride is calcium chloride.

4. The process of claim 3 wherein the bath contains from 3 to 6 moles of calcium chloride per liter.

5. The process of claim 4 wherein the bath contains about 4.5 moles per liter of calcium chloride and at most two molar equivalents of free hydrogen ions per liter.

6. The process of claim 2 wherein the alkali metal chloride is lithium chloride.

7. The process of claim 2 wherein the alkaline earth metal chloride is magnesium chloride.

8. The process of claim 2 wherein the aqueous bath also contains hydrochloric acid in a concentration ranging from about 0 to 50 milliequivalent grams per liter.

9. The process of claim 1 comprising the additional step of acidifying the leach reaction mixture following the leaching step (c) with hydrochloric acid.

10. The process of claim 9 wherein the residue resulting from the leaching step (c) is washed with a washing agent selected from the group consisting of dilute hydrochloric acid, a solution of an alkali metal chloride, and a solution of an alkaline earth metal chloride, followed by filtration, and the filtrate obtained recycled to the acidification step.

11. The process of claim 10 wherein the washing agent is a metal chloride selected from the group consisting of an alkali metal chloride and an alkaline earth metal chloride.

12. The process of claim 11 wherein the alkali metal chloride is sodium chloride.

13. The process of claim 10 wherein the washing agent is dilute hydrochloric acid.

14. The process of claim 1 wherein step (d) is carried out by liquid-liquid extraction by means of an aromatic organic solvent, followed by re-extraction of the germanium tetrachloride by means of an aqueous re-extraction solution.

15. The process of claim 14 wherein the aqueous re-extraction solution is neutralized and recycled to leaching step (c).

16. The process of claim 15 wherein the excess of the re-extraction solution, after neutralization, is drained off beyond the amount required to maintain the alkaline metal chloride concentration specified in step (c), and the acidity of the remainder then adjusted to the value specified in step (c) with hydrochloric acid before recycling it to step (c).

17. The process of claim 14 wherein the spent aqueous phase obtained after the liquid-liquid extraction with the organic solvent is partly recycled to the leaching step (c).

18. The process of claim 1 wherein step (d) is carried out by direct distillation of the germanium tetrachloride from the solution resulting from the leaching step (c).

19. The process of claim 18 wherein the direct germanium tetrachloride distillation range is carried out in the presence of a chlorine flow.

20. The process of claim 1 wherein the germaniferous metallic zinc is derived from the tails of the distillation column of a zinc refining installation.

21. The process of claim 1 wherein step (a) is carried out in a vacuum distilling furnace.

22. The process of claim 1 wherein the germanium tetrachloride recovered in step (d) is subsequently washed with hydrochloric acid.

23. The process of claim 1 wherein the germaniferous metallic zinc also contains, in addition to germanium and zinc, the metals copper, zinc, iron, arsenic, silver, lead, tin, antimony, and aluminum.

24. The process of claim 1 wherein the distillation residue is pulverized to a grain size not exceeding about 500 microns before the leaching step (c).

25. The process of claim 1 wherein the distillation residue is in the liquid state and is converted to granules of a grain size not exceeding about 500 microns before the leaching step (c).

26. The process of claim 1 wherein the leaching step (c) is carried out at a temperature of about from 50° C to 80° C.

27. The process of claim 1 wherein step (e) comprises a pyrohydrolysis method.

28. The process of claim 1 comprising the additional step of reducing the germanium oxide obtained in step (f) to metallic germanium.

29. A process for recovering germanium as germanium oxide from a germaniferous metallic zinc containing, in addition to germanium and zinc, the heavy metals lead, iron, tin, copper, arsenic, antimony, and silver, and the light metal aluminum, comprising:
   (a) distilling the germaniferous metallic zinc under non-oxidizing conditions to obtain a distillate containing essentially all the zinc and the other volatile metal elements, and a distillation residue containing essentially all the germanium and the heavy, non-volatile metal elements;
   (b) pulverizing the distillation residue from step (a) to a grain size not exceeding about 2 mm;
   (c) leaching the pulverized distillation residue from step (b) in suspension in an aqueous bath containing (1) an alkaline metal chloride selected from the group consisting of an alkali metal chloride and an alkaline earth metal chloride in a concentration of about from 3 to 6 moles per liter and (2) at most two molar equivalents of free hydrogen ions per liter, with chlorine gas at a temperature of about from 50° to 80° C to convert the arsenic present into arsenic acid, the heavy metals present into their respective chlorides and the germanium present into germanium tetrachloride;

(d) filtering the reaction mixture resulting from step (c) to obtain a residue containing insoluble heavy metal chlorides including silver chloride and lead chloride and an aqueous filtrate containing the soluble heavy metal chlorides, the alkaline metal chloride, and the germanium tetrachloride;

(e) washing the residue from step (d) with a washing agent to solubilize the insoluble metal chlorides thereby to obtain an aqueous phase containing undissolved residue and the wash solution containing the dissolved metal chlorides and the washing agent;

(f) filtering the aqueous phase obtained in step (e) to obtain the wash solution from step (e) as the aqueous filtrate;

(g) combining the aqueous filtrate obtained in step (f) with the aqueous filtrate containing the soluble heavy metal chlorides, the alkaline metal chloride, and the germanium tetrachloride, obtained in step (d);

(h) acidifying the combined filtrates obtained in step (g) with hydrochloric acid to an acidity of about 2N;

(i) directly distilling the acidified solution obtained in step (h) to obtain an aqueous phase containing hydrochloric acid, the soluble chlorides of the heavy metals, and the alkaline metal chloride as a residue, and germanium tetrachloride as the distillate;

(j) separating the aqueous phase obtained in step (i) into an aqueous hydrochloric acid solution which is recycled to step (h) and an aqueous solution containing the dissolved chlorides of the heavy metals including copper, zinc, iron, arsenic, silver, lead, tin, antimony, aluminum, and the alkaline metal chloride, which may be further treated to recover these metals;

(k) washing the germanium tetrachloride obtained in step (i) with hydrochloric acid;

(l) purifying the washed germanium tetrachloride from step (k) by fractional distillation to separate any arsenious chloride that may be present from the germanium tetrachloride;

(m) hydrolyzing the purified germanium tetrachloride with water to convert it into hydrochloric acid and germanium oxide which precipitates;

(n) separating the germanium oxide from the hydrochloric acid solution; and (o) recycling the separated hydrochloric acid solution obtained in step (n) to step (h).

30. The process of claim 29 wherein the washing agent is selected from the group consisting of an alkali metal chloride and an alkaline earth metal chloride.

31. The process of claim 30 wherein the alkali metal chloride washing agent is sodium chloride.

32. The process of claim 29 wherein the alkaline metal chloride is calcium chloride.

33. The process of claim 29 wherein the washing agent is hydrochloric acid.

34. A process for recovering germanium as germanium oxide from a germaniferous metallic zinc containing, in addition to germanium and zinc, the heavy metals lead, iron, tin, copper, arsenic, antimony, and silver, and the light metal aluminum, comprising:

(a) distilling the germaniferous metallic zinc under non-oxidizing conditions to obtain a distillate containing essentially all the zinc and the other volatile metal elements, and a distillation residue containing essentially all the germanium and the heavy, non-volatile metal elements;

(b) pulverizing the distillation residue from step (a) to a grain size not exceeding about 2 mm;

(c) leaching the pulverized distillation residue from step (b) in suspension in an aqueous bath containing (1) and alkaline metal chloride selected from the group consisting of an alkali metal chloride and an alkaline earth metal chloride in a concentration of about from 3 to 6 moles per liter and (2) at most two molar equivalents of free hydrogen ions per liter, with chlorine gas at a temperature of about from 50° to 80° C to convert the arsenic present into arsenic acid, the heavy metals present into their respective chlorides, and the germanium present into germanium tetrachloride;

(d) recovering the germanium tetrachloride from the aqueous leaching reaction mixture of step (c); and (e) converting the recovered germanium tetrachloride from step (d) into germanium oxide.

35. The process of claim 34 wherein the germanium as germanium oxide tetrachloride is recovered in step (d) by liquid-liquid extraction.

36. The process of claim 34 wherein the germanium tetrachloride is recovered in step (d) by distillation.

37. The process of claim 34 wherein the germanium tetrachloride is converted to germanium oxide in step (e) by hydrolysis.

38. A process for recovering germanium from a germaniferous metallic zinc containing, in addition to germanium and zinc, the heavy metals lead, iron, tin, copper, arsenic, antimony, and silver, and the light metal aluminum, comprising:

(a) distilling the germaniferous metallic zinc under non-oxidizing conditions to obtain a distillate containing essentially all the zinc and the other volatile metal elements, and a distillation residue containing essentially all the germanium and the heavy, non-volatile metal elements;

(b) pulverizing the distillation residue from step (a) to a grain size not exceeding about 2 mm;

(c) leaching the pulverized distillation residue from step (b) in suspension in an aqueous bath containing (1) an alkaline metal chloride selected from the group consisting of an alkali metal chloride and an alkaline earth metal chloride in a concentration of about from 3 to 6 moles per liter and (2) at most two molar equivalents of free hydrogen ions per liter, with chlorine gas at a temperature of about from 50° to 80° C to convert the arsenic present into arsenic acid, the heavy metals present into their respective chlorides and the germanium present into germanium tetrachloride;

(d) subjecting the reaction mixture resulting from step (c) to solid-liquid separation to obtain an undissolved residue and an aqueous phase comprising the leaching solution containing the heavy metal chlorides, the alkaline metal chloride, and the germanium tetrachloride;

(e) subjecting the leaching solution from step (d) to aqueous liquid-organic liquid interchange with an organic solvent to obtain an aqueous phase containing the alkaline metal chloride and the chlorides of the heavy metals and an organic phase containing the germanium tetrachloride;

(f) re-extracting the organic phase containing the germanium tetrachloride from step (e) with an aqueous re-extracting phase whereupon the germanium tetrachloride is hydrolyzed to germanium oxide which percipitates out thereby to obtain the organic solvent which is recycled to step (e) and an aqueous phase containing formed hydrochloric acid and the germanium oxide as a precipitate;

(g) subjecting the aqueous phase containing the precipitated germanium oxide obtained in step (f) to solid-liquid separation to recover the germanium oxide as the solid phase and aqueous hydrochloric acid as the liquid phase; and (h) recycling the hydrochloric acid obtained in step (g) to step (c).

39. The process of claim 38 wherein the alkaline metal chloride is calcium chloride.

40. The process of claim 39 comprising the additional steps:

(i) recycling a part of the aqueous phase containing the calcium chloride and the chlorides of the heavy metals obtained in step (e) to leaching step (c);

(j) neutralizing the portion of the aqueous phase remaining in step (i) with lime to obtain an aqueous phase containing the calcium chloride and the heavy metals precipitated in the form of their hydroxides;

(k) subjecting the aqueous phase obtained in step (j) to solid-liquid separation to obtain the precipitated heavy metal hydroxides which may be further treated to recover the metals and an aqueous solution containing the calcium chloride;

(l) draining off the excess of the aqueous calcium chloride solution obtained in step (k) beyond the amount required to maintain the calcium chloride concentration specified in step (c);

(m) adjusting the acidity of the portion of the aqueous calcium chloride solution remaining in step (l) to the value specified in step (c) with hydrochloric acid; and (n) recycling the acidity-adjusted aqueous calcium chloride solution obtained in step (m) to leaching step (c).

* * * * *